United States Patent [19]
Brissenden et al.

[11] Patent Number: 5,609,540
[45] Date of Patent: Mar. 11, 1997

[54] FULL-TIME DOUBLE OFFSET TRANSFER CASE

[75] Inventors: James S. Brissenden, Baldwinsville; John D. Zalewski, Liverpool, both of N.Y.

[73] Assignee: New Venture Gear, Inc., Troy, Mich.

[21] Appl. No.: 516,441

[22] Filed: Aug. 17, 1995

[51] Int. Cl.[6] .................. B60K 17/346; F16H 48/30; F16H 37/08; F16H 48/10
[52] U.S. Cl. .................. 475/202; 475/204; 475/206; 475/222; 180/248; 180/249; 180/250
[58] Field of Search .................. 475/202, 204, 475/206, 222, 223, 295; 180/247, 248, 249, 250

[56] References Cited

U.S. PATENT DOCUMENTS

| | | | |
|---|---|---|---|
| 4,632,207 | 12/1986 | Moore | 180/247 |
| 4,677,873 | 7/1987 | Eastman et al. | 74/665 GE |
| 4,688,447 | 8/1987 | Dick | 74/665 F |
| 4,938,738 | 7/1990 | Fuelberth et al. | 475/317 |
| 5,046,998 | 9/1991 | Frost | 475/221 |
| 5,078,660 | 1/1992 | Williams et al. | 475/84 |
| 5,106,351 | 4/1992 | Williams et al. | 475/250 |
| 5,116,293 | 5/1992 | Reuter | 475/202 |
| 5,159,847 | 11/1992 | Williams et al. | 74/337.5 |
| 5,358,454 | 10/1994 | Bowen et al. | 475/94 |

*Primary Examiner*—Charles A. Marmor
*Assistant Examiner*—Nathan O. Jensen
*Attorney, Agent, or Firm*—Harness, Dickey & Pierce, P.L.C.

[57] ABSTRACT

A power transfer system for a four-wheel drive vehicle having a full-time transfer case with its input angled relative to its outputs by means of a constant velocity (CV) universal joint. More specifically, the transfer case input includes a first rotary member adapted to be rotatably driven about the rotary axis of the transmission output shaft, a second rotary member supported for rotation about a second rotary axis that is angled relative to the first rotary axis, and a CV joint interconnecting the first and second rotary members. The transfer case outputs include a pair of rotary output members supported for relative rotation about a common third rotary axis that is offset from the second rotary axis. A torque transfer arrangement is provided for transferring torque from the transfer case input to its outputs. The CV joint allows the transfer case to be angulated so that reduced departure angles are achieved with respect to the prop shaft connections. The full-time transfer case includes a two-speed reduction apparatus, and interaxle differential, a lock-out clutch, and a shift arrangement for permitting the vehicle operator to select operation in various drive modes.

25 Claims, 10 Drawing Sheets

| MODE | RANGE CLUTCH | LOCK-OUT CLUTCH |
|---|---|---|
| 2WD | H | Z |
| PT-4WH | H | Y |
| FT-4WH | H | X |
| N | N | X |
| PT-4WL | L | Y |

FULL-TIME DOUBLE OFFSET TRANSFER CASE

BACKGROUND OF THE INVENTION

The present invention relates to a power transfer system for a four-wheel drive motor vehicle and, in particular, to a transfer case having means for establishing an angular driving connection between the transfer case input and the output of a multi-speed transmission.

In view of the increased popularity of four-wheel drive vehicles, a plethora of power transfer systems are currently utilized for distributing tractive power (i.e., drive torque) to all four wheels of the motor vehicle. Conventionally, most four-wheel drive power transfer systems include a transfer case having an input shaft driven by the transmission output shaft, a rear output shaft driven by the input shaft and which is interconnected via a rear prop shaft to a rear axle assembly for driving the rear wheels, a front output shaft interconnected via a front prop shaft to a front axle assembly for driving the front wheels, and a torque transfer arrangement for continuously or selectively transferring drive torque from the rear output shaft to the front output shaft.

In "part-time" four-wheel drive systems, the transfer case is equipped with a shift mechanism which permits the vehicle operator to selectively couple and de-couple the front and rear output shafts for shifting the vehicle between a twowheel drive mode and a four-wheel drive mode. An example of a part-time transfer case is shown and disclosed in commonly-owned U.S. Pat. No. 5,159,847 to Williams et al. In "full-time" four-wheel drive systems, the transfer case is equipped with an interaxle differential for continuously dividing drive torque between the front and rear output shafts while permitting speed differentiation therebetween. Commonly-owned U.S. Pat. No. 4,677,873 to Eastman et al. discloses an exemplary full-time transfer case. In order to prevent traction loss due to excessive wheel slip, most full-time transfer cases are also equipped with a "slip limiting" device for selectively or automatically locking the interaxle differential to limit or prevent speed differentiation in response to the wheel slip. Commonly-owned U.S. Pat. Nos. 5,078,660 and 5,106,351 to Williams et al. disclose exemplary full-time transfer cases equipped with a viscous coupling for limiting slip across the interaxle differential.

Alternatively, "on-demand" power transfer systems are used for automatically directing power to the non-driven wheels, without any input or action on the part of the vehicle operator, when traction is lost at the driven wheels. Typically, a speed-sensitive torque transfer device is installed between the front and rear output shafts for progressively delivering torque to the front output shaft in response to increasing speed differential therebetween. Such torque transfer devices commonly include viscous couplings, geared couplings, and the like. An exemplary geared torque transfer device is disclosed in commonly-owned U.S. Pat. No. 5,358,454 to Bowen et al. More recently, however, the torque transfer device used in on-demand four-wheel drive systems has been a modulatable clutch, the output of which is controlled electronically in response to various detected vehicle operating parameters. An example of an electronically-controlled on-demand power transfer system is disclosed in commonly-owned U.S. Pat. No. 5,363,938 to Wilson et al.

Transfer cases are commonly classified as being either of a single offset type or a double offset type. In single offset transfer cases, only one of the output shafts is offset from the rotational axis of the input shaft. In particular, several of the above-noted commonly owned patents illustrate a conventional arrangement wherein the rotary axis of the rear output shaft is commonly aligned with that of the input shaft while the rotary axis of the front output shaft is parallel to, yet offset from, the rotary axis of the input shaft. However, a problem commonly associated with this type of transfer case is that the rear prop shaft, due to its central alignment, takes up a substantial amount of the vehicle's underbody space which inhibits placement of an underbody spare tire and/or necessitates usage of a saddle-type gas tank. In double offset transfer cases, the front and rear output shafts are commonly aligned and are both offset from the rotary axis of the input shaft. Accordingly, such double offset transfer cases provide increased underbody space for purposes of locating a spare tire and/or installing a larger fuel tank.

A major design consideration in the development of four-wheel drive systems is to minimize the departure angles at the connections between the transfer case front and rear output shafts and their corresponding prop shafts. The departure angle is defined as the included angle between the rotary axis of the prop shaft and that of the transfer case output shaft. Traditionally, single cardion universal joints are used at each end of the prop shafts if the departure angle is less than about five degrees. If the departure angles exceed this threshold limit, then more expensive double cardion universal joints are required at the prop shaft/transfer case connection. As an alternative, U.S. Pat. Nos. 4,632,207 to Moore and 5,116,293 to Reuter disclose the use of a constant velocity (CV) joint at the front output of a single offset type of transfer case. An alternative arrangement is likewise shown in U.S. Pat. No. 4,688,447 to Dick. While such arrangements attempt to solve the problems associated with large departure angles at the front output, they do not address this concern at the rear output nor are the teachings applicable to double offset transfer cases.

SUMMARY OF THE INVENTION

Accordingly, the present invention is directed to overcoming the disadvantages associated with conventional four-wheel drive vehicles by providing a power transfer system having a transfer case with its input angled relative to its outputs by means of a constant velocity (CV) universal joint. More specifically, the input for the transfer case includes a first rotary member adapted to be driven about the rotary axis of the transmission output shaft, a second rotary member supported for rotation about a second rotary axis that is angled relative to the first rotary axis, and a CV joint interconnecting the first and second rotary members. The outputs for the transfer case include a pair of rotary output members supported for rotation about a third rotary axis that is offset from the second rotary axis. As such, the CV joint allows the transfer case to be angulated so that reduced departure angles are achieved with respect to the prop shaft connections.

A further feature of the present invention is to provide a CV joint in the input section of a full-time transfer case. In one preferred form, the transfer case is equipped with a two-speed reduction apparatus, an interaxle differential, a lock-out out clutch and a shift mechanism that are cooperatively operable for establishing a Two-Wheel High-Range drive mode, a Part-Time Four-Wheel High-Range drive mode, a Full-Time Four-Wheel High-Range drive mode, a Neutral non-driven mode and a Part-Time Four-Wheel Low-Range drive mode. At least one additional drive mode is also available and includes a Full-Time Four-Wheel low-range drive mode.

According to yet another feature, the part-time/full-time transfer case of the present invention is equipped with a dual-planetary interaxle differential that is operably associated with the lock-out clutch for selectively transferring torque to the transfer case's front and rear output shafts. Full-time operation is made available when the lock-out clutch is in a first position for permitting speed differentiation and torque splitting across the dual-planetary differential to the output shafts. Part-time operation is made available when the lock-up clutch is in a second position for inhibiting speed differentiation across the dual-planetary interaxle differential and for coupling the output shafts for common rotation. Two-wheel drive operation is made available when the lock-up clutch is in a third position whereat the input component of the dual-planetary differential is directly coupled to one of the transfer case output shafts.

BRIEF DESCRIPTION OF THE DRAWINGS

Further objects, features, and advantages of the present invention will become apparent from analysis of the following written specification, the accompanying drawings, and the appended claims in which:

DETAILED DESCRIPTION OF THE PREFERRED EMBODIMENTS

In general, the present invention is directed to a transfer case for use in four-wheel drive vehicles which is equipped with a constant velocity (CV) type universal joint for angling the transfer case input relative to its outputs so as to reduce the departure angles of the front and rear drivelines relative thereto. The reduced driveline angles facilitate the use of less expensive single cardion joints at the transfer case outputs in substitution for the traditional, more expensive, double cardion variety. The following written disclosure, when taken in conjunction with the drawings and claims, is intended to describe the best mode known to the inventors for making the inventive concepts claimed.

Figure 1:
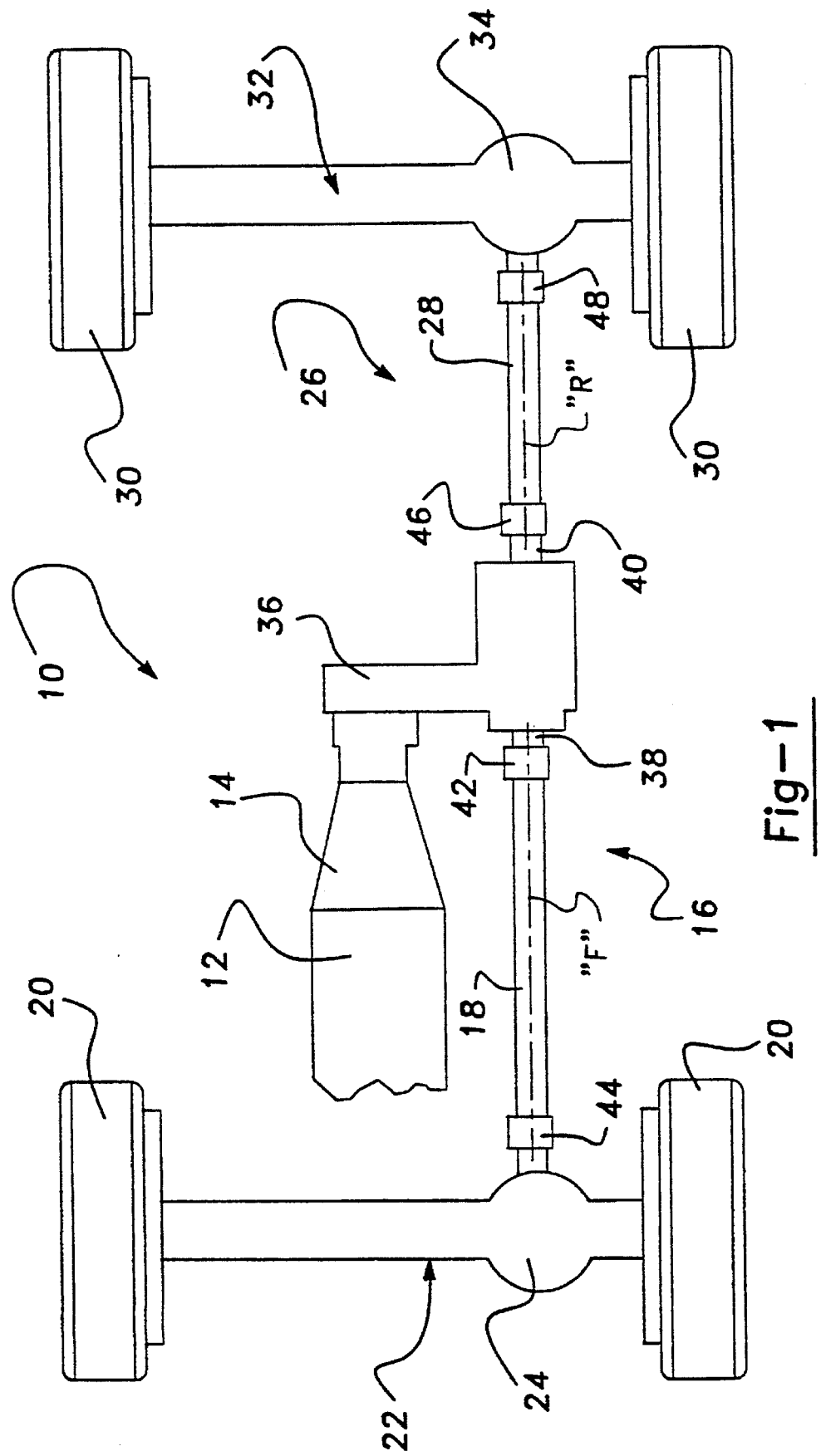
FIG. 1 is a top plan view of a power transfer system for a four-wheel drive motor vehicle utilizing the double offset transfer case of the present invention for connecting the drivetrain to the front and rear drivelines.
Figure 2:
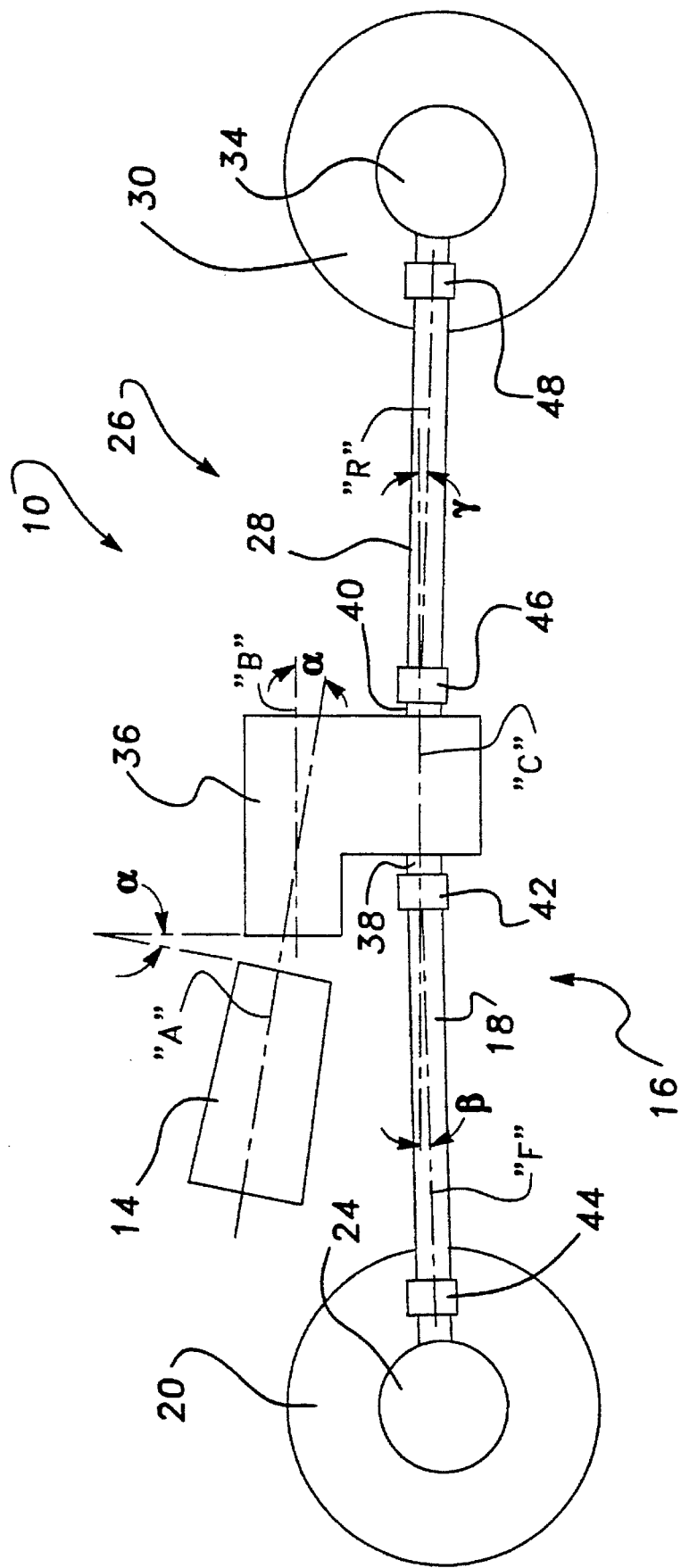
FIG. 2 is a side view of FIG. 1, illustrating the angular relationship between the input of the transfer case and the output of the drivetrain as well as the angular relationship between the front and rear drivelines and the transfer case outputs.

Referring to FIGS. 1 and 2 of the drawings, a power transfer system for a four-wheel drive vehicle is shown which incorporates the novel principles and features of the present invention. The vehicle includes a drivetrain 10 defined schematically by an engine 12 and a transmission 14. The vehicle also includes a front driveline 16 defined by a front prop shaft 18 that is interconnected to a pair of front wheels 20 via a front axle assembly 22 including a front differential 24. As seen, front prop shaft 18 is adapted to rotate about an axis, denoted by reference letter "F". A rear driveline 26 is defined by a rear prop shaft 28 that is interconnected to a pair of rear wheels 30 via a rear axle assembly 32 including a rear differential 34. Likewise, rear prop shaft 28 is adapted to rotate about an axis, denoted by reference letter "R". Drivetrain 10 is coupled to front driveline 16 and rear driveline 26 via a transfer case 36. As will be discussed with greater specificity hereinafter, transfer case 36 has an input 37 that is driven by the output of transmission 14, a front output shaft 38, a rear output shaft 40, and a torque transfer arrangement 41 for transferring drive torque from input 37 to output shafts 38 and 40. Front output shaft 38 is connected to the rearward end of front prop shaft 18 via a conventional single cardion universal joint 42. Similarly, the forward end of front prop shaft 18 is connected to front differential 24 by means of a single cardion universal joint 44. Likewise, rear output shaft 40 is connected to a forward end of rear prop shaft 28 via a single cardion universal joint 46 while the rearward end of rear prop shaft 28 is connected to rear differential 34 by means of a single cardion universal joint 48.

Figure 3:
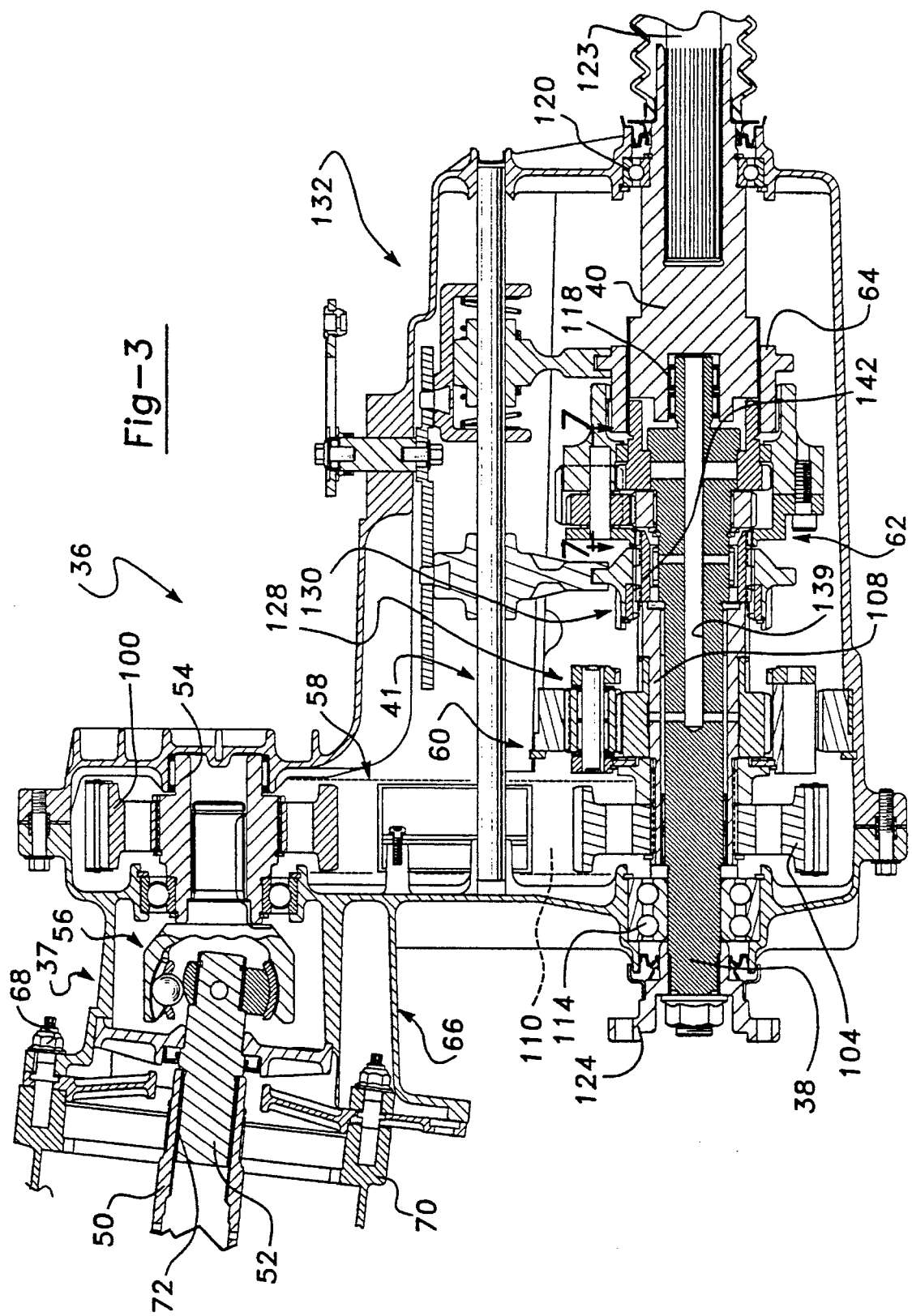
FIG. 3 is a section view of the double offset transfer case of the present invention.
Figure 4:
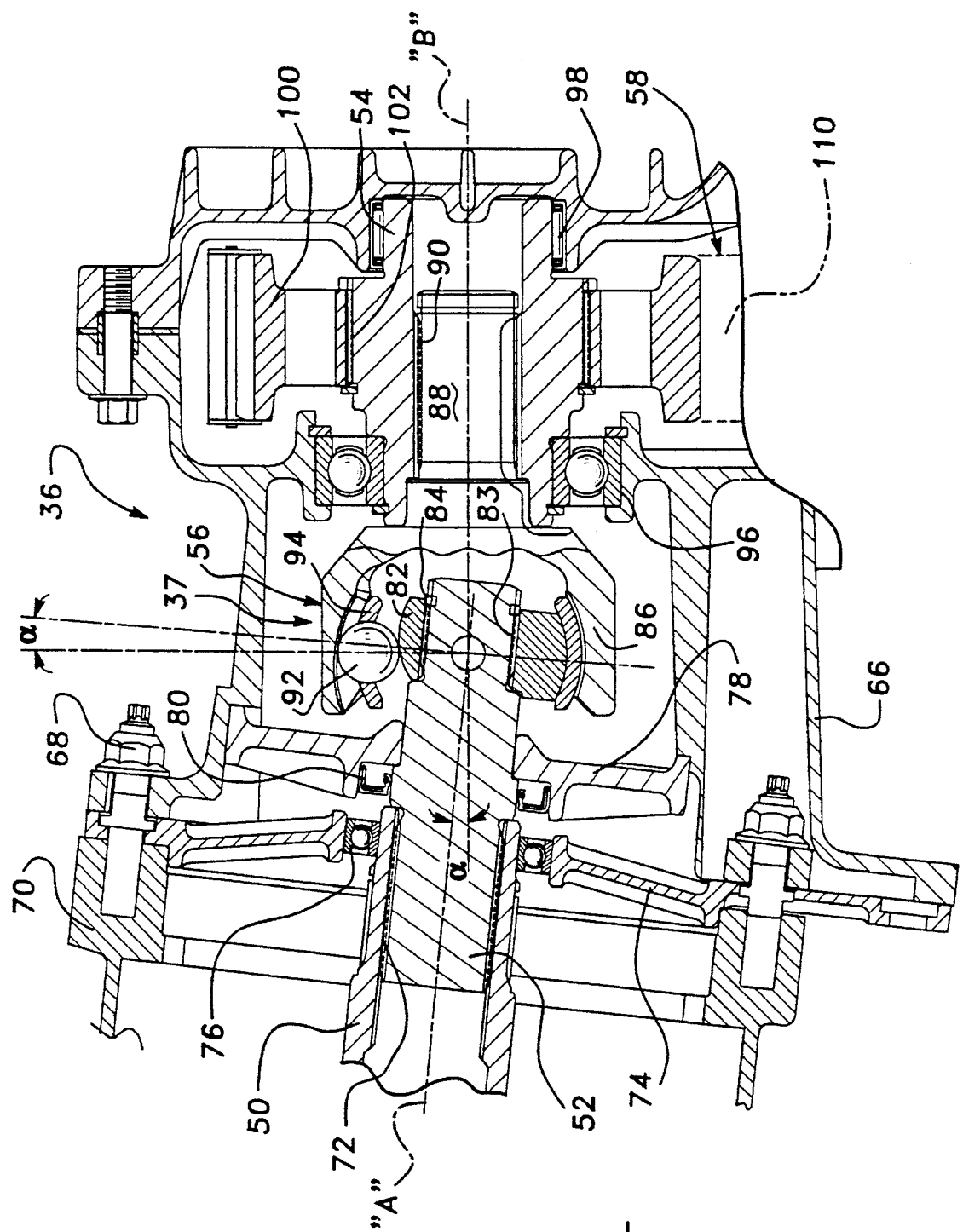
FIG. 4 is an enlarged partial view of FIG. 3 showing the integration of a CV joint into the input section of the transfer case in greater detail.

As best seen from FIGS. 2 and 3, transmission 14 includes an output shaft 50 that is connected to the input of transfer case 36. The transfer case input includes a first rotary member or input shaft 52 that is angularly interconnected to a second rotary member or drive shaft 54 via a constant velocity (CV) universal joint 56. As seen, input shaft 52 is supported for rotation about a first axis of rotation, denoted by reference letter "A". Moreover, drive shaft 54 is supported within transfer case 36 for rotation about a second axis of rotation, denoted by reference letter "B". Rear output shaft 40 is supported for rotation about a third axis of rotation, denoted by reference letter "C". Moreover, front output shaft 38 is supported for rotation relative to rear output shaft 40 and is commonly aligned to rotate about third axis "C". As will be detailed, drive torque is selectively transmitted to front output shaft 38 and rear output shaft 40 from drive shaft 54 through torque transfer arrangement 41 which includes a drive connection 58, a two-speed reduction apparatus 60, an interaxle differential 62, and a lock-out clutch 64.

Rotary axis "A" of transmission output shaft 50 and transfer case input shaft 52 is vertically coplanar with rotary axis "B" of drive shaft 54. Preferably, front axis "F" and rear axis "R" are both vertically coplanar with rotary axis "C" of transfer case output shafts 38, 40. From FIGS. 2 and 3, it is shown that the rotary axis "B" of drive shaft 54 intersects the rotary axis "A" of input shaft 52 at an input angle, denoted by ($\alpha$). This angular relationship, permitted via CV joint 56, essentially tips transfer case 36 such that the front departure angle, denoted by ($\beta$), between rotary axis "F" of front prop shaft 18 and rotary axis "C" of front output shaft 38 can be substantially reduced. Similarly, this angulated input arrangement provides a reduction in the rear departure angle, denoted by (γ), between rotary axis "R" of rear prop shaft 28 and rotary axis "C" of rear output shaft 40. According to one driveline application now contemplated, an input angle (α) of about five degrees results in departure angles (β) and (γ) of less than two degrees. As noted, such reduced departure angles facilitate the use of less costly universal joints and provide a significant advantage over prior art systems. Obviously, the particular input and departure angles selected will depend on each specific transfer case and driveline application.

With particular attention now drawn to FIGS. 3 through 7, the various components of transfer case 36 will now be described with greater specificity. Transfer case 36 includes a housing 66 that is secured via bolts 68 to transmission housing 70. A splined connection 72 couples transmission output shaft 50 to one end of input shaft 52. Transmission output shaft 50 is shown supported in housing 66 via an apertured cover plate 74 and a suitable bearing assembly 76. Likewise, input shaft 52 is shown supported for rotation in housing 66 via an apertured support plate 78 and a suitable seal 80. An inner race 82 of a Rzeppa-type CV joint 56 is fixed via a splined connection 83 to the stepped opposite end of input shaft 52 and retained thereon via a retaining ring 84. An outer race 86 surrounds inner race 82 and has an integral stub shaft 88 that is coupled via a splined connection 90 to drive shaft 54. A plurality of balls 92, entrapped by a cage 94, are disposed between and in contact with inner race 82 and outer race 86. It is contemplated that any suitable type and size of CV joint can be used for providing the angular connection at the input of transfer case 36.

Drive shaft 54 is supported from housing 66 by a pair of axially-spaced bearing assemblies 96 and 98 for rotation about the "B" rotary axis. Drive connection 58 includes a drive sprocket 100 fixed via a splined connection 102 to the outer periphery of drive shaft 54 for common rotation therewith. Drive connection 58 also includes a driven sprocket 104 that is fixed via a splined connection 106 for common rotation with an elongated tubular quill shaft 108. A drive chain 110, shown in phantom, interconnects driven sprocket 104 to drive sprocket 100. Quill shaft 108 concentrically surrounds a portion of front output shaft 38 and is supported thereon for relative rotation via suitable bearing assemblies 112 and 113. Moreover, one end of front output shaft 38 is supported from housing 66 via a suitable bearing assembly 114 while its opposite end is piloted in a bore 116 formed in one end of rear output shaft 40 and supported therein via a suitable bearing assembly 118. The opposite end of rear output shaft 40 extends out of housing 66 and is supported therefrom via bearing assembly 120. The portion of rear output shaft 40 which extends beyond housing 66 includes an internally-splined bore 122 adapted to receive an externally-splined yoke 123 of universal joint 46. Similarly, the portion of front output shaft 38 extending out of housing 66 includes a yoke 124 adapted for connection to a mating portion of universal joint 42.

Figure 5:
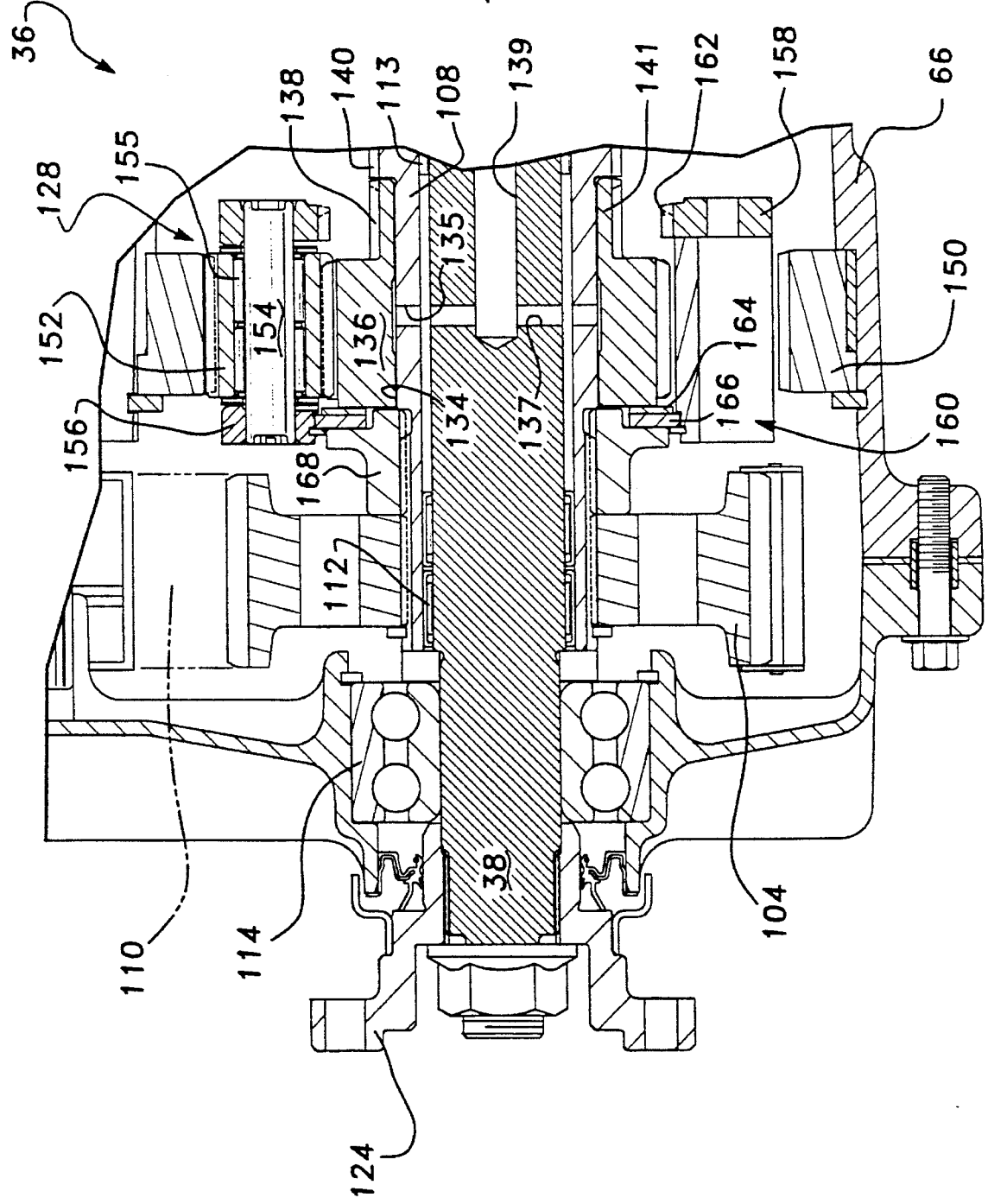
FIG. 5 is another enlarged partial view of FIG. 3 showing the two-speed reduction apparatus in greater detail.

Referring particularly to FIGS. 3 and 5, two-speed reduction apparatus 60 is shown to include a planetary gear assembly 128 that is selectively driven by quill shaft 108 via axial movement of a range clutch 130 in response to actuation of a shift mechanism 132 for establishing a high-speed and a low-speed drive connection and a non-driven condition with a drive hub 142. Quill shaft 108 has an external bearing surface 134 on which a sun gear 136 is journally supported. Lubrication is supplied via a conventional lube pump, preferably of the gerotor type (not shown), which delivers lubricating fluid from a sump area within housing 66 to bearing surface 134 through radial ports 135 in quill shaft 108 and radial ports 137 in front output shaft 38, all of which communicates with a central flow passage 139 fed by the lube pump. Sun gear 136 includes an integral axial extension 141 on which external clutch teeth 138 are formed. In addition, clutch teeth 140 are formed on an annular end portion of quill shaft 108 such that clutch teeth 140 are located adjacent to, and are alignable with, sun gear clutch teeth 138. Drive hub 142 is rotatably supported on front output shaft 38 via a suitable bearing assembly 143 and has external clutch teeth 144 that are located adjacent to, and are alignable with, quill shaft clutch teeth 140. A radial bearing assembly 146 is disposed between drive hub 142 and quill shaft 108 to facilitate relative rotation therebetween. A series of radial ports 147 communicate with central flow passage 139 for delivering lubricating fluid to bearing assemblies 143 and 146.

Planetary gear assembly 128 also includes a ring gear 150 that is fixed to housing 66 so as to be held stationary relative thereto. A plurality of pinion gears 152 (only one shown) are each journally supported on a pin 154 via a bearing assembly 155. Each pin 154 extends between fore and aft carrier rings 156 and 158, respectively, which, combined with pins 154 and pinion gears 152, define a planet carrier 160. Pinion gears 152 mesh with sun gear 136 and ring gear 150. Internal clutch teeth 162 are formed on aft carrier ring 158. A suitable thrust washer 164 separates sun gear 136 from a retaining ring 166 that is fixed to front carrier ring 156 and which rotates relative to a spacer hub 168 that is splined to quill shaft 108 for axially locating sun gear 136 relative to driven sprocket 104.

Figure 6:
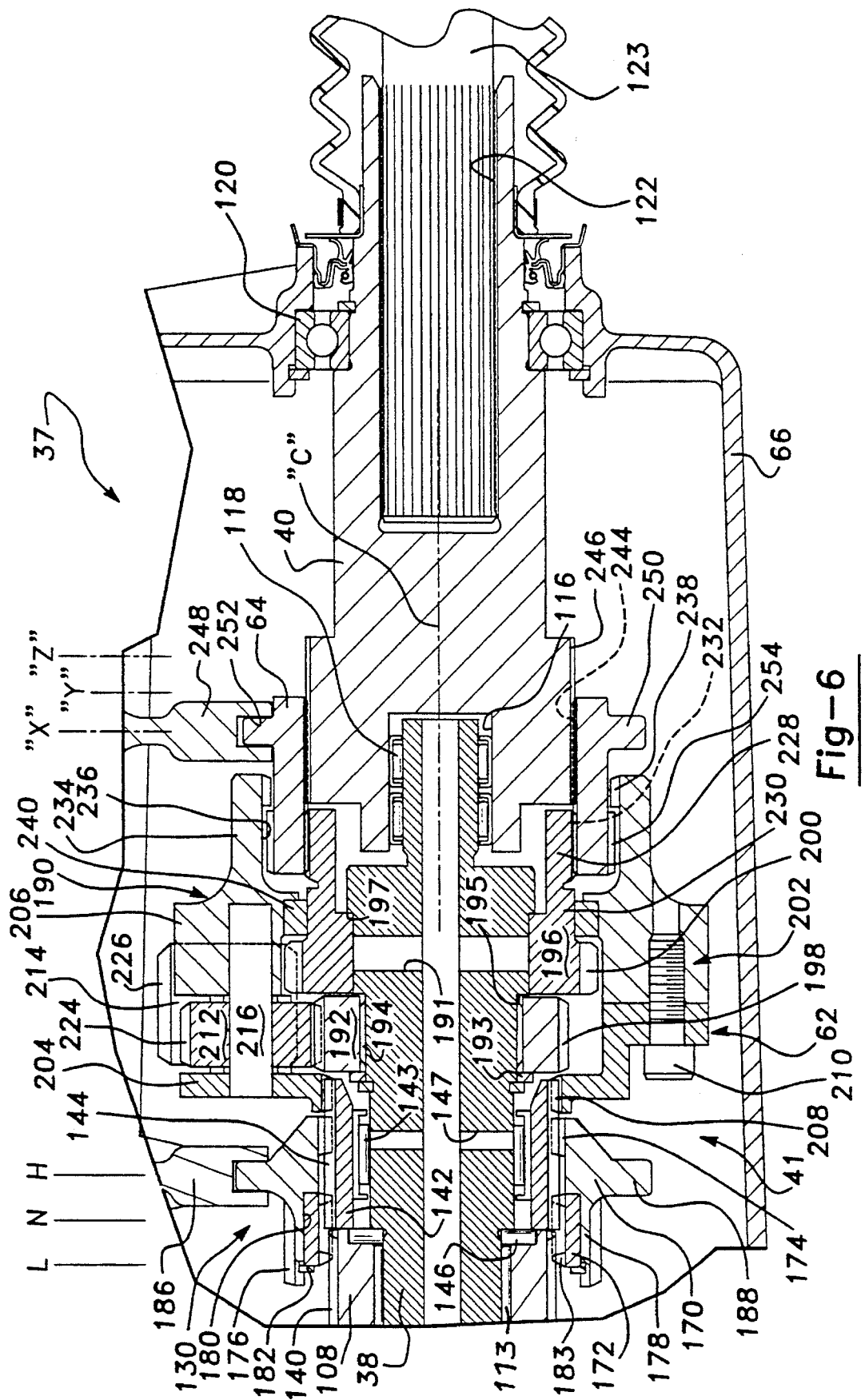
FIG. 6 is also an enlarged partial view of FIG. 3 showing the interaxle differential and lock-out clutch in greater detail.

As best seen from FIG. 6, range clutch 130 includes a pair of sleeves 170 and 172 that are selectively engageable with one or more of sun gear 136, quill shaft 108 and drive hub 142 for establishing the two different speed drive connections and the non-driven condition between quill shaft 108 and drive hub 142. In particular, outer sleeve 170 has internal clutch teeth 174 which constantly engage external clutch teeth 144 of drive hub 142. Likewise, outer sleeve 170 has external clutch teeth 176 formed on a drum-like axial extension 178 that are selectively engageable with internal clutch teeth 162 on aft carrier ring 158. Inner sleeve 172 is rotatably supported against an inner bearing surface 180 of outer sleeve extension 178 and retained relative thereto by a snap ring 182. Inner sleeve 172 includes internal clutch teeth 183 that continuously mesh with external clutch teeth 140 of quill shaft 108 and which are also selectively engageable with either sun gear clutch teeth 138 or drive hub clutch teeth 144 depending on the axial position of range clutch 130. A shift fork 186 entraps a radial extension 188 of outer sleeve 170 and is selectively operable to move range clutch 130 between positions L, N, and H which respectively represent a Low-Range drive connection, a Neutral non-driven condition and a High-Range drive connection. When range clutch 130 is positioned in the L position, clutch teeth 183 of inner sleeve 172 engage both sun gear clutch teeth 138 and quill shaft clutch teeth 140 while external clutch teeth 176 on outer sleeve 170 engage carrier clutch teeth 162 and its internal clutch teeth 174 engage drive hub clutch teeth 144. As such, inner sleeve 172 couples sun gear 136 for common rotation with quill shaft 108. Thus, sun gear 136 drives pinion gears 152 around ring gear 150 such that planet carrier 160 is driven at a reduced or underdrive speed ratio relative to quill shaft 108. Moreover, due to the connection of planet carrier 160 to drive hub 142 via outer sleeve 170 of range clutch 130, drive hub 142 is also driven at the reduced ratio speed relative to quill shaft 108 for establishing the Low-Range drive connection therebetween.

When range clutch 130 is moved rightward to the N position, clutch teeth 183 of inner sleeve 172 are de-coupled from sun gear teeth 138 and thus only engage quill shaft clutch teeth 140. Moreover, clutch teeth 176 of outer sleeve 170 are uncoupled from planet carrier teeth 162 and clutch teeth 174 of outer sleeve 170 only engage drive hub clutch teeth 144. Since inner sleeve 172 is free to rotate relative to outer sleeve 170, there is no driven connection between quill shaft 108 and drive hub 142 through planetary gear assembly 128 so as to establish the Neutral non-driven condition. When range clutch 130 is moved farther to the right to its H position, a direct connection is established between quill shaft 108 and drive hub 142. In particular, in the H position, outer sleeve 170 is uncoupled from planet carrier 160 and its internal clutch teeth 174 are engaged with drive hub clutch teeth 144. In addition, clutch teeth 183 of inner sleeve 172 meshingly engage both quill shaft clutch teeth 140 and drive hub clutch teeth 144. Thus, range clutch 130 directly couples drive hub 142 to quill shaft 108 for establishing the High-Range drive connection. An advantageous feature of planetary gear assembly 128 is that sun gear 136 is disconnected from driven connection to quill shaft 108 when the High-Range drive connection is established. As such, the planetary gear assembly 128 arrangement remains stationary during High-Range drive operation.

Figures 7, 9:
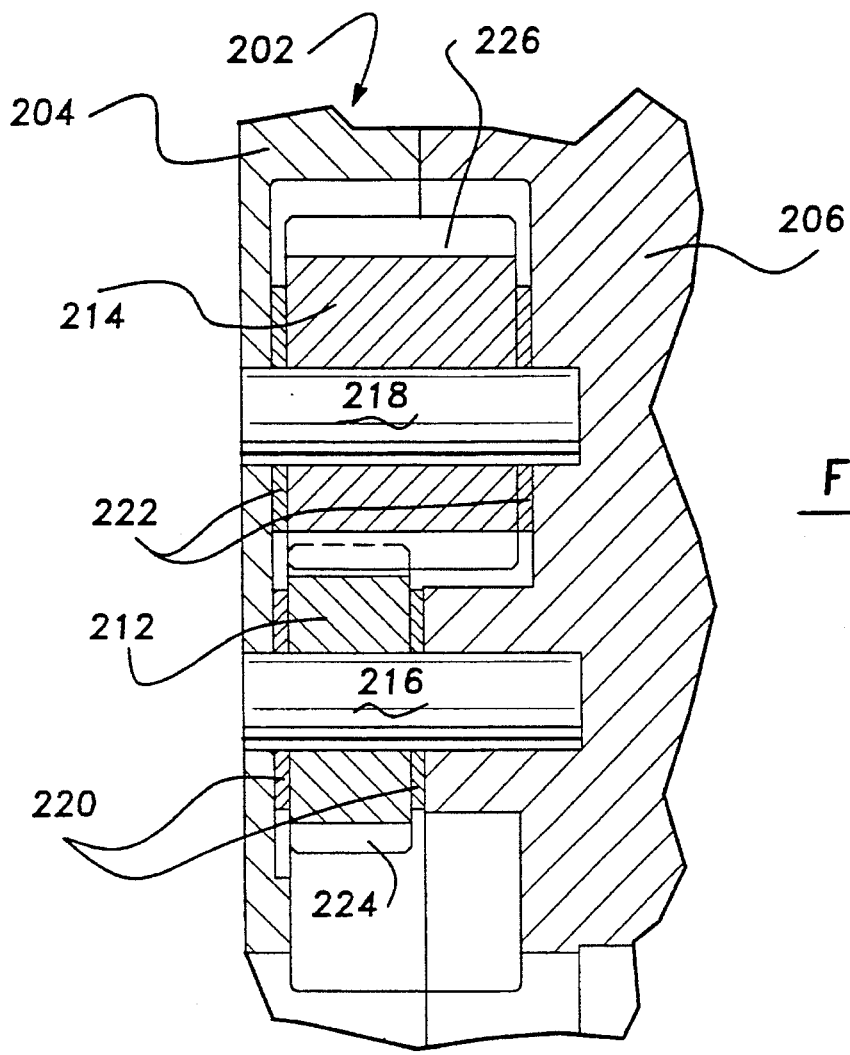
FIG. 7 is a partial sectional view of the interaxle differential taken generally along line 7—7 of FIG. 3.
FIG. 9 illustrates a table of five different transfer case operating modes which may be selected by actuation of the shift mechanism.

Referring now to FIGS. 3, 6 and 7, interaxle differential 62 is, in a preferred construction, a dual-planetary gear assembly 190 employing dual sun gears and dual planet gear sets in a compact structure that achieves differential action and unequal torque splitting by the sun gears being selectively connected to front and rear drivelines 16 and 26, respectively, via lock-out clutch 64. In particular, dual-planetary gear assembly 190 includes a first sun gear 192 fixed via a splined connection 194 to front output shaft 38, and a second sun gear 196 journally supported on front output shaft 38 in an axially juxtaposed manner relative to first sun gear 192. Lubrication is supplied to second sun gear 196 via radial ports 191 communicating with central flow passage 139. First sun gear 192 is axially located on front output shaft 38 between a retention ring 193 and a radial stop shoulder 195. Second sun gear 196 is axially located for relative rotation on front output shaft 38 between first sun gear 192 and radial stop shoulder 197. First sun gear 192 has its peripheral gear teeth 198 located at a first predetermined radial distance from rotary axis "C" of front output shaft 38. Second sun gear 196 has its peripheral gear teeth 200 located at a second predetermined radial distance from rotary axis "C" which is greater than the first predetermined radial distance of first sun gear 192.

Dual-planetary gear assembly 190 has a planet carrier 202 including a first carrier ring 204 and a second carrier ring 206. First carrier ring 204 is fixed by splined connection 208 to clutch teeth 144 of drive hub 142. The carrier rings, secured by threaded bolts 210, rotatably support a set of first half-length planet gears 212 and a set of second full-length planet gears 214 by means of their associated journal pins 216 and 218, respectively. Preferably, dual-planetary gear assembly 190 includes at least three first planet gears 212 and second planet gears 214 that are arranged in meshed pairs around the circumference of planet carrier 202. As best seen from FIGS. 6 and 7, first planet gears 212 extend longitudinally substantially one-half the full axial extent between carrier rings 204 and 206, and are each separated therefrom via washers 220 mounted on pins 216. Likewise, second planet gears 214 extend longitudinally substantially the full axial extent between carrier rings 204 and 206, and are each separated therefrom via washers 222 mounted on pins 218. Preferably, first planet gears 212 and second planet gears 214 have the identical diameters and the same number of teeth. Pins 216 have their longitudinal axis located at a predetermined radius from rotary axis "C" that is less than the predetermined radius of pins 218. Thus, gear teeth 198 on first sun gear 192 engage only gear teeth 224 of first planet gears 212 while gear teeth 200 of second sun gear 196 engage only gear teeth 226 of second planet gears 214. As noted, each circumferentially-aligned pair of planet gears 212 and 214 are arranged such that, in each set, gear teeth 224 of first planet gear 212 constantly mesh with gear teeth 226 of second planet gear 214.

With continued reference to FIG. 6, second sun gear 196 is shown to have an integral extension 228 that is axially offset rearwardly from its primary hub portion 230 and which has external clutch teeth 232 formed on its outer peripheral surface. Additionally, second carrier ring 206 includes a rearwardly-extending cylindrical hub 234 having an inner peripheral surface defining a proximal nontoothed portion 236 and a distal toothed portion on which internal clutch teeth 238 are formed. An annular bearing or bushing ring 240 is positioned between an annular shoulder notched-out of second carrier ring 206 and an external peripheral surface on hub portion 230 of second sun gear 196. As such, planet carrier 202 is supported for relative rotation relative to sun gears 192 and 196 as it acts as the input component for driving dual-planetary gear assembly 190 via its connection to drive hub 142. A feature of dual-planetary gear assembly 190 is that the drive torque delivered to drive hub 142 is divided between rear output shaft 40 and front output shaft 38 in a ratio that is proportional to the number of gear teeth on each of first sun gear 192 and second sun gear 196. Preferably, second sun gear 196 has more teeth than that of first sun gear 192 which, in combination with planet gears 212 and 214 having an identical number of teeth, cause a greater proportion of the torque to be delivered to rear output shaft 40 when transfer case 36 is operating in its full-time operating state.

Referring still to FIG. 6, lock-out clutch 64 is shown to include internal splines 244 that are constantly engaged with external splines 246 of rear output shaft 40 such that lock-out clutch 64 is supported for axial sliding movement on rear output shaft 40 between a first position "X", a second position "Y", and a third position "Z" in response to movement of a second shift fork 248 caused by actuation of shift mechanism 132. A radial segment 250 of lock-out clutch 64 is entrapped within a groove 252 formed in the distal end of second shift fork 248. As will be detailed, shift mechanism 132 causes coordinated movement of shift forks 186 and 248 for establishing the various available drive modes available with transfer case 36. When lock-out clutch 64 is in its "X" position, as shown in FIG. 6, its internal spline teeth 244 are meshingly engaged with external clutch teeth 232 of second sun gear 196 as well as external splines teeth 246 of rear output shaft 40, while its external clutch teeth 254 are aligned with non-toothed surface 236 of second carrier ring 206 so as to be disengaged from internal clutch teeth 238 of planet carrier 202. In this position, drive hub 142 drives planet carrier 202 which, in turn, drives first sun gear 192 and second sun gear 196 via planet gears 212 and 214. That is, first sun gear 192 drives front output shaft 38 and second sun gear 196 drives rear output shaft 40 with speed differentiation and a predetermined torque split therebetween for defining full-time four-wheel drive operation.

Thus, with lock-out clutch 64 in its "X" position, dual-planetary gear assembly 192 is operating in an "open" (i.e., unlocked) condition.

When lock-out clutch 64 is in its "Y" position, its internal spline teeth 244 engage both external clutch teeth 232 of second sun gear 196 and rear output shaft spline teeth 246. However, in this position, external clutch teeth 254 of lock-out clutch 64 are meshingly engaged with internal clutch teeth 238 on second carrier ring 206. Thus, planet carrier 202 and second sun gear 196 are directly coupled via lock-out clutch 64 for common rotation. As such, interaxle speed differentiation is prevented and dual-planetary gear assembly 192 is considered to be "locked" for concurrently driving both first sun gear 192 and second sun gear 196 with an equal torque distribution therebetween for defining part-time four-wheel drive operation. Finally, when lock-out clutch 64 is in its "Z" position, its internal spline teeth 244 are disengaged from second sun gear clutch teeth 232 and its external clutch teeth 254 are engaged with planet carrier clutch teeth 238, thereby disconnecting second sun gear 196 from coupled engagement with lock-out clutch 64. In this position, rear output shaft 40 is coupled directly to drive hub 142 via planet carrier 202 and lockout clutch 64, and no drive torque is transferred through dual-planetary gear assembly 190 to first sun gear 192 and front output shaft 38 for establishing two-wheel drive operation.

Figure 8:
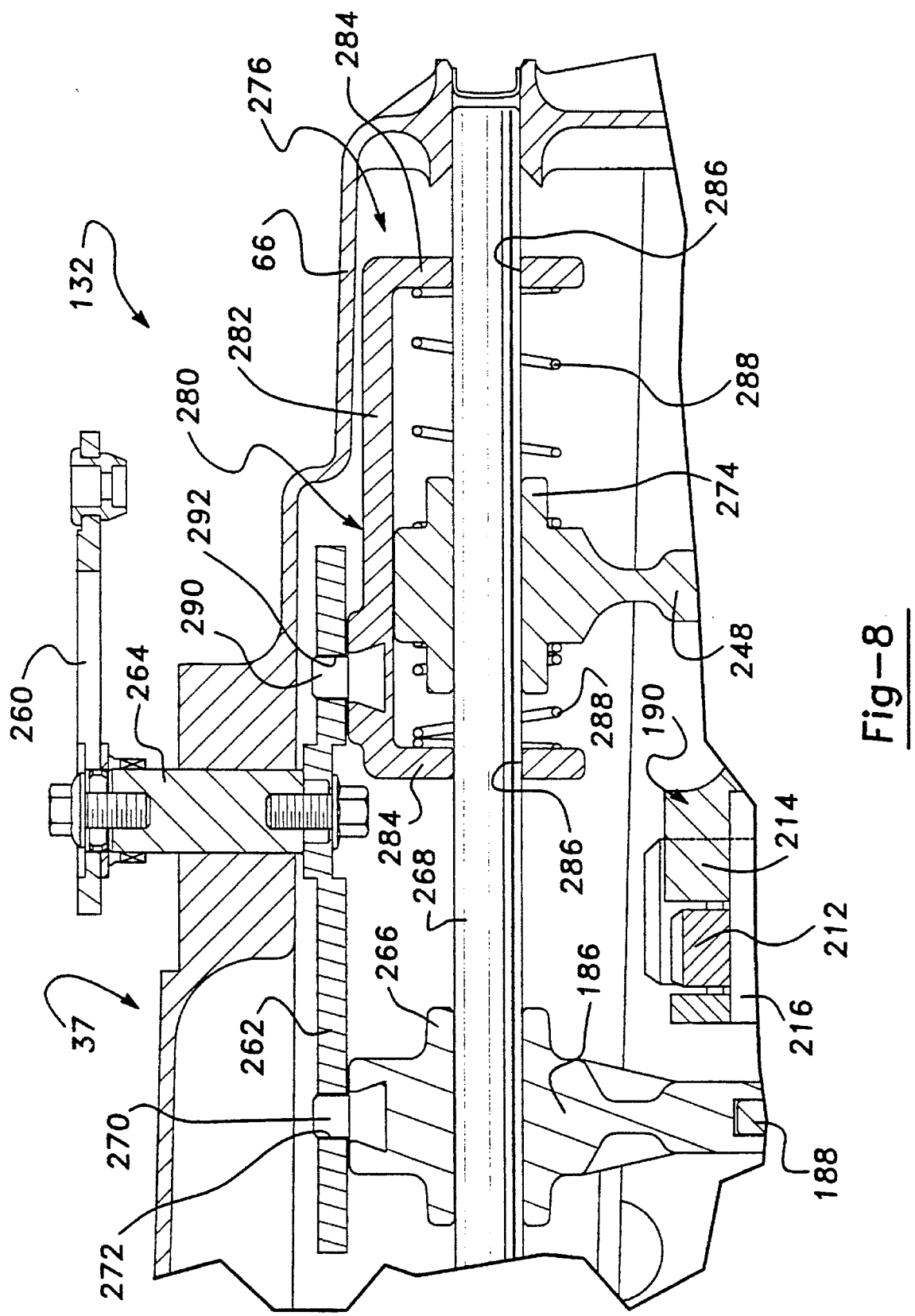
FIG. 8 is yet another enlarged partial view of FIG. 3 showing the manually-actuated shift mechanism provided for shifting the transfer case into various drive modes.

Referring now to FIG. 8, the various components associated with shift mechanism 132 for controlling coordinated movement of range clutch 130 and lock-out clutch 64 are shown with greater specificity. According to the construction shown, shift mechanism 132 is adapted to be coupled via conventional linkages to a manually-operable shift lever that is located within the passenger compartment of the motor vehicle and which is operable for permitting the vehicle operator to select operation of transfer case 36 in one of the available drive modes. In general, shift mechanism 132 includes a pivotable lever 260 that is coupled to a sector plate 262 via an actuator shaft 264. Shift forks 186 and 248 are each coupled to sector plate 262 via a follower pin and guide slot arrangement for changing the rotary output (i.e., torque) of lever 260 and sector plate 262 into axially-directed forces capable of moving range clutch 130 and lock-out clutch 64. In particular, range fork 186 includes a tubular section 266 that is slidingly supported on a shaft 268 mounted to housing 66. A follower pin 270 is fixed to shift fork 186 and is confined within a range slot 272 formed in sector plate 262. The contour of range slot 272 is such that rotation of sector plate 262 in a first direction will shift range clutch 130 from the L position, through the N position, and into the H position. Obviously, reverse rotation of sector plate 262 results in the movement of range clutch 130 through the positions in opposite order.

Shift fork 248 is similar to shift fork 186 and likewise includes a tubular section 274 that is slidingly supported on shaft 268. A spring-biasing mechanism 276 is provided for applying a biasing load on shift fork 248 for assisting in completing engagement of lock-out clutch 64 with clutch teeth 232 on sun gear extension 228 and clutch teeth 238 on second carrier ring 206 upon axial movement relative thereto. Spring-biasing mechanism 276 is adapted to provide a self-centering biasing load on lock-out clutch 64 to ensure lock-up after completion of the rotary movement of sector plate 262 in those conditions where slight speed differences create blockage of the clutch teeth on lock-out clutch 64 from passing into engagement with the clutch teeth on sun gear extension 238 or second carrier ring 206 until the blockage is eliminated. To this end, an angled bracket 280 is provided which has a leg section 282 and two bent arm sections 284 extending therefrom. Apertures 286 are formed in arm sections 284 through which shaft 268 extend. A pair of biasing springs 288 act between each arm section 284 and shift fork 248 for normally centering shift fork 248 in a balanced equilibrium condition. A follower pin 290 is fixed to leg section 282 of bracket 280 and is disposed within a mode slot 292 formed in sector plate 262. The contour of mode slot 292 is designed to cause controlled axial movement of mode lock-out clutch 64 in response to rotation of sector plate 262. Moreover, the contour of range slot 272 and mode slot 292 are engineered to produce coordinated movement of range clutch 130 and lock-out clutch 64 in response to rotation of sector plate 262 for establishing each of the available drive modes.

According to the particular embodiment disclosed, sector plate 262 is designed to coordinate movement of range clutch 130 and lock-out clutch 64 to establish at least five different operational modes. These operational modes include a Two-Wheel high-range drive mode (2WH), a Part-Time Four-Wheel high-range drive mode (PT-4WH), a Full-Time Four-Wheel high-range drive mode (FT-4WH), a Neutral mode (N), and a Part-Time Four-Wheel low-range drive mode (PT-4WL). As clearly set forth in the chart of FIG. 9, the position of range clutch 130 and lock-out clutch 64 for establishing each of the above-noted operating states for transfer case 36 is disclosed. As stated, coordinated axial movement of lock-out clutch 64 and range clutch 130 is accomplished by the contour of mode slot 292 and range slot 272 which causes axial movement of shift forks 248 and 186 in response to the amount and direction of rotation of sector plate 262. While not shown, sector plate 262 is preferably provided with a series of detents, each designating the rotated position of sector plate 262 for a particular drive mode, that cooperate with a plunger-type poppet for positively locating sector plate 262 in a desired rotated position. It is also contemplated that transfer case 36 could be adapted to provide a Full-Time Four-Wheel low-range drive mode in addition to the above-noted modes (FT-4WL). If such a mode was made available, range clutch 130 would be located in its L position and lock-out clutch 64 would be located in its "X" position. Such an additional or substitute drive mode simply requires modification to the profiles of range slot 272 and mode slot 292 to provide the desired coordinated movement of lock-out clutch 64 and range clutch 130. While transfer case 36 has been disclosed to provide several different drive modes, it should be understood that any combination of the above-noted drive modes can be provided, as dictated by the particular transfer case application.

Spring-biasing mechanism 246 is operable to permit the vehicle operator to shift between the (2WH), (PT-4WH) and (FT-4WH) drive modes without stopping the vehicle. For example, if sector plate 232 is rotated from its position establishing the (2WH) mode to its position establishing the (PT-4WH) mode, then a tooth butting condition may momentarily prevent engagement of clutch teeth 244 on lock-out clutch 64 with clutch teeth 232 on second sun gear 196. In response, the forward movement of bracket 280 caused by movement of pin 290 in mode slot 292 acts to compress the rear one of biasing springs 288 against shift fork 248. Compression of the rear one of biasing springs 288 exerts a biasing force on shift fork 248 of a sufficient magnitude to move lock-out clutch 64 into engagement with second sun gear 196 once the tooth butting condition between their respective clutch teeth 244 and 232 is removed. If front driveline 16 includes a "live" front axle assembly 22, then normal wind-up and/or a slight turning condition will quickly eliminate the tooth butting condition. Thus, shift mechanism 132 permits transfer case 36 to be shifted "on-the-fly" between its various two-wheel and four-wheel drive modes.

Figure 10:
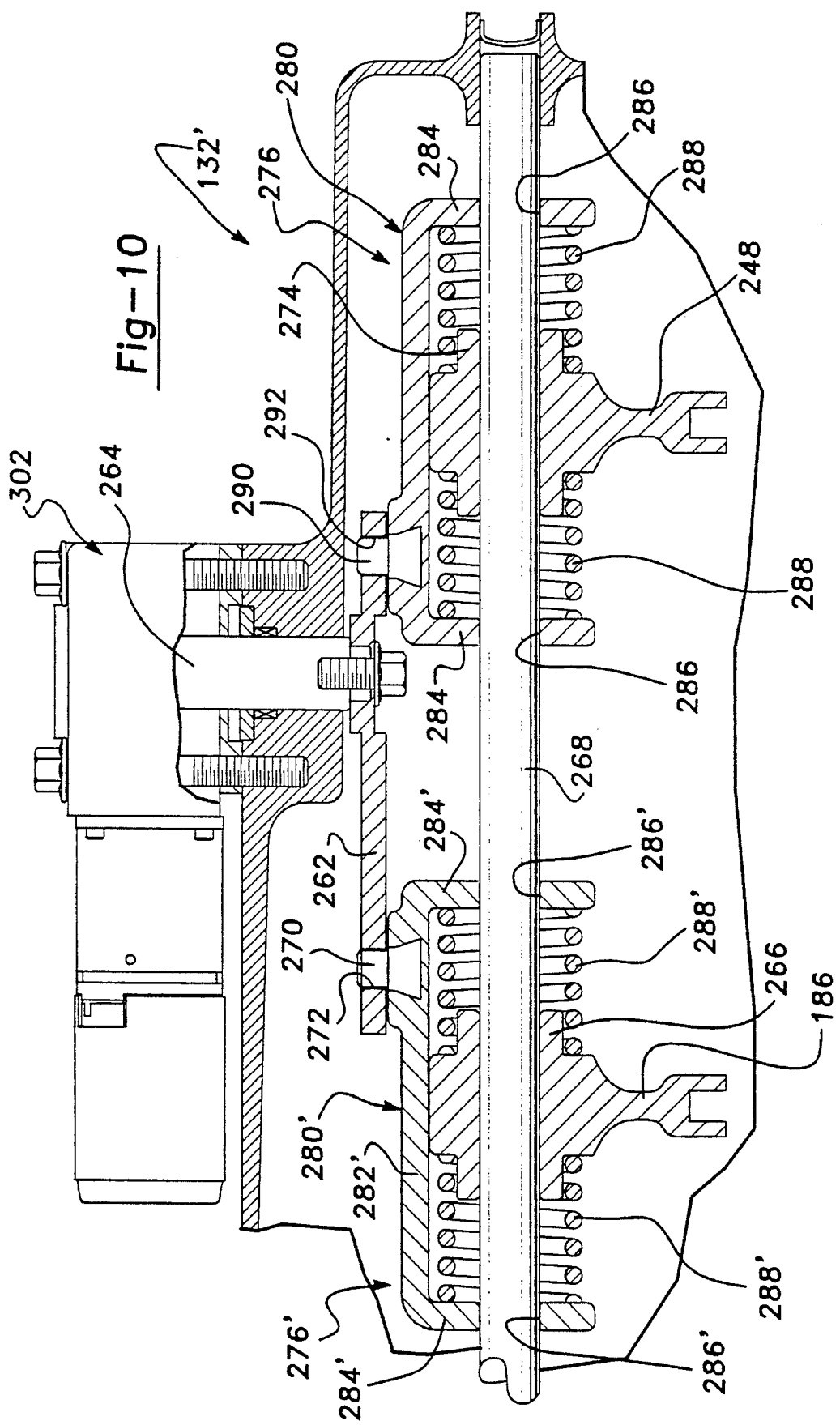
FIG. 10 is a view, similar to FIG. 8, illustrating an electrically-controlled shift mechanism adapted for use with the transfer case of the present invention.

FIG. 10 is a view, similar to FIG. 8, illustrating an alternative shift mechanism 132' used in association with an electrically-controlled shift system wherein the vehicle operator actuates push-button or rotary switches for actuating a rotary-driven actuator. As seen, identical or substantially similar functioning components of shift mechanism 132' that were previously disclosed in association with shift mechanism 132 are identified by the same reference numerals. Preferably, the rotary actuator is an electric gearmotor 302 having a rotary output (not shown) coupled to actuator shaft 264. Thus, gearmotor 302 is adapted to controllably rotate sector plate 262 between its various rotated positions in response to control signals sent to gearmotor 302 from a remote controller unit (not shown). The controller unit generates the control signals in response to the mode signals delivered thereto upon the vehicle operator actuating the selection switches or push-buttons. As is also seen, shift fork 186 is operably associated with a spring-biasing mechanism 276'. As is similar to biasing mechanism 276, spring-biasing mechanism 276' includes an angled bracket 280' having leg 282', arms 284' with apertures 286', and a pair of biasing springs 288'. This arrangement maintains a biasing load on shift fork 186 to ensure movement of range clutch 130 to either of the L and H positions following complete rotation of sector plate 262 by gearmotor 302 to its corresponding position. This arrangement is also adapted to avoid overloading of gearmotor 302 if a blockage condition momentarily inhibits full engagement of range clutch 130 with the clutch teeth on sun gear 136 and aft carrier ring 158. While electrically-controlled shift mechanism 130' is disclosed to utilize one actuator for moving both shift forks, it is understood that a pair of actuators could likewise be utilized for individually controlling movement of each shift fork.

Figure 11:
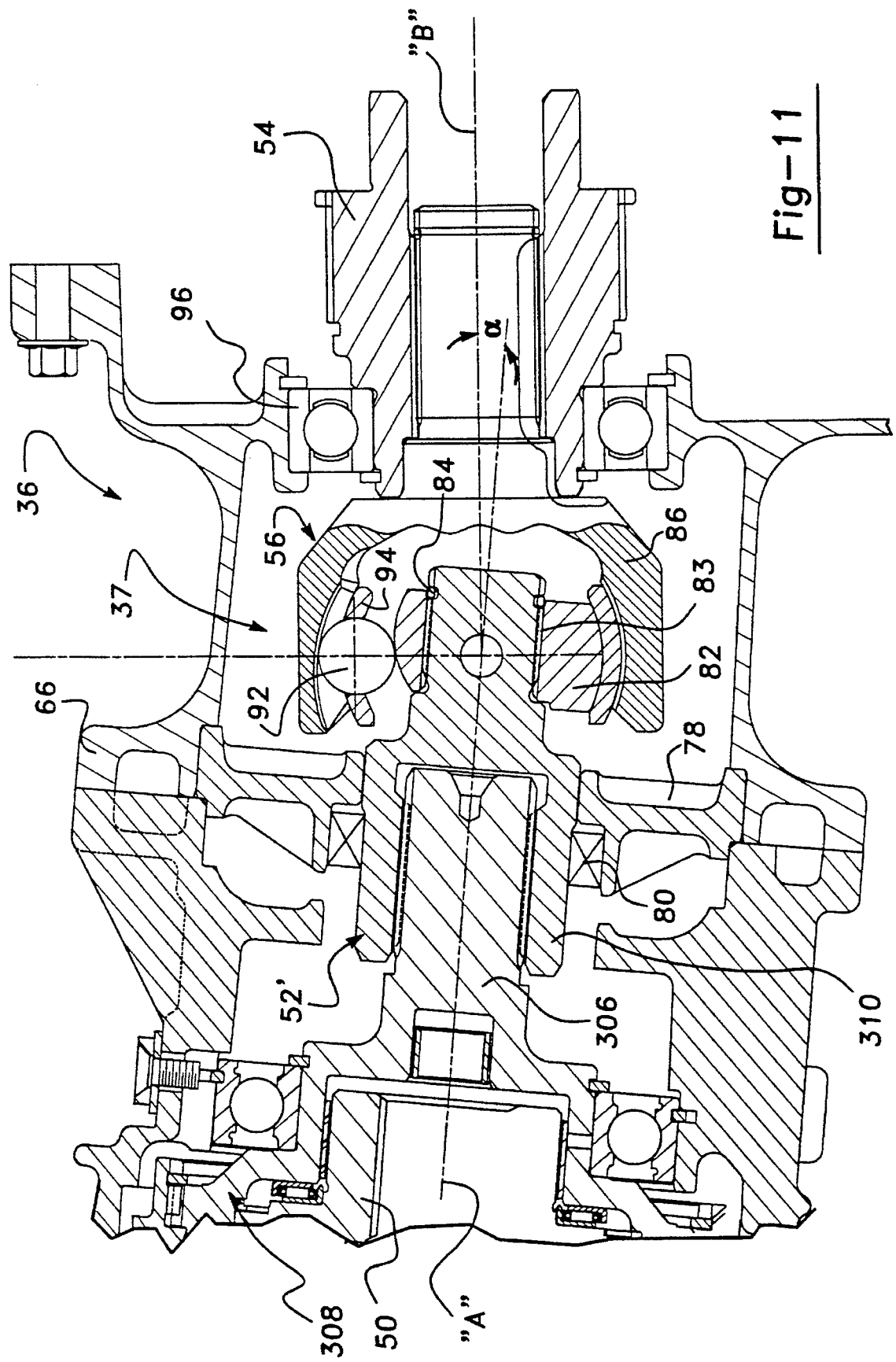
FIG. 11 is a sectional view of an alternative construction for the input section of the transfer case.

The particular input components associated with input 37 of transfer case 36 will be dictated by the specific output components of transmission 14. Thus, while the embodiment disclosed teaches of using an input shaft 52 for coupling transmission output shaft 50 to one rotary component of CV joint 56, various other arrangements are contemplated. For instance, transmission output shaft 50 may be coupled directly to inner race 82 of CV joint 56. A specific alternative example is shown in FIG. 11 wherein an externally-splined output shaft 306 of an add-on overdrive unit 308 is coupled to an internally-splined drum portion 310 of an input shaft 52'. Add-on overdrive unit 308 is operable for providing an additional forward speed ratio for an existing multi-speed automatic transmission by causing output shaft 306 to be driven at an overdrive speed ratio relative to transmission output shaft 50. Reference can be made to commonly-owned U.S. Pat. No. 4,798,103 to Eastman et al. for details of such an add-on overdrive unit.

The foregoing discussion discloses and describes preferred embodiments of the present invention as contemplated by the inventors to set forth the best mode of carrying out the inventive concepts. One skilled in the art will readily recognize from such discussions, and from the accompanying drawings and claims, that various changes, modifications and variations can be made therein without departing from the true spirit and scope of the invention as defined by the following claims.

What is claimed is:

1. A power transfer apparatus for transferring drive torque from a vehicular drivetrain to first and second drivelines, comprising:
   a first input shaft rotatably driven by the drivetrain about a first rotary axis;
   a second input shaft supported for rotation about a second rotary axis that is angled relative to said first rotary axis;
   a constant velocity universal joint interconnecting said second input shaft for rotation with said first input shaft;
   first and second output shafts respectively interconnected to the first and second drivelines, at least one of said first and second output shafts being supported for rotation about a third rotary axis that is offset from said second rotary axis;
   an interaxle differential interconnecting said first and second output shafts for permitting speed differentiation therebetween so as to establish a Full-Time four-wheel drive mode; and
   a torque transfer mechanism interconnecting said interaxle differential to said second input member for transferring drive torque to said first and second output shafts.

2. The power transfer apparatus of claim 1 wherein said interaxle differential includes an input driven by said torque transfer mechanism, a first output coupled for rotation with said first output shaft, a second output coupled for rotation with said second output shaft, and gear means for transferring drive torque from said input to each of said first and second outputs.

3. The power transfer apparatus of claim 2 wherein said interaxle differential is a dual planetary assembly such that said input is a planet carrier, said first output is a first sun gear, said second output is a second sun gear, and said gear means includes a set of first planet gears rotatably supported on said planet carrier that are meshed with said first sun gear, a set of second planet gears rotatably supported on said planet carrier that are meshed with said second sun gear, and wherein each of said first planet gears is meshed with one of said second planet gears.

4. The power transfer apparatus of claim 2 further comprising:
   a lock-out clutch that is operable in a first position whereat said first output of said interaxle differential is directly coupled to said first output shaft for establishing a Full-Time four-wheel drive mode permitting speed differentiation between said first and second output shafts, and wherein said lock-out clutch is operable in a second position whereat said input and first output of said interaxle differential are coupled for common rotation with said first output shaft for establishing a Part-Time four-wheel drive mode inhibiting speed differentiation between said first and second output shafts; and
   a shift mechanism for moving said lock-out clutch between said first and second positions.

5. The power transfer apparatus of claim 4 further comprising:
   a speed reduction apparatus for establishing a high-range speed ratio connection and a reduced low-range speed ratio connection between said second input shaft and said torque transfer mechanism; and
   a range clutch that is movable between a high-range position whereat said high-range connection is established and a low-range position whereat said low-range connection is established, said shift mechanism operable for controlling movement of said lock-out clutch and said range clutch for establishing a Full-Time four-wheel high-range drive mode and a Part-Time four-wheel low-range drive mode.

6. The power transfer apparatus of claim 5 wherein said shift mechanism is further operable for establishing a Part-Time four-wheel high-range drive mode.

7. The power transfer apparatus of claim 5 wherein said range clutch is movable to a neutral position for disconnecting said torque transfer mechanism from said second input shaft so as to establish a Neutral non-driven mode.

8. The power transfer apparatus of claim 1 further comprising:
  a lock-out clutch that is operable in a first position whereat said first output of said interaxle differential is directly coupled to said first output shaft so as to establish a Full-Time four-wheel drive mode, and wherein said lock-out clutch is operable in a second position whereat said first output of said interaxle differential is uncoupled from said first output shaft and said input of said interaxle differential is coupled to said first output shaft for establishing a Two-Wheel drive mode such that drive torque is only transferred from said torque transfer mechanism to said first output shaft; and
  a shift mechanism for moving said lock-out clutch between said first and second positions.

9. The power transfer apparatus of claim 8 further comprising:
  a speed reduction apparatus for establishing a high-range speed ratio connection and a reduced low-range speed ratio connection between said second input shaft and said torque transfer mechanism; and
  a range clutch that is movable between a high-range position whereat said high-range connection is established and a low-range position whereat said low-range connection is established, said shift mechanism being operable for controlling movement of said lock-out clutch and said range clutch for establishing a Full-Time four-wheel high-range drive mode, a Part-Time four-wheel low-range drive mode, and a Two-Wheel high-range drive mode.

10. The power transfer apparatus of claim 9 wherein said shift mechanism is further operable for establishing a Part-Time four-wheel high-range drive mode.

11. The power transfer apparatus of claim 10 wherein said range clutch is movable to a neutral position for disconnecting said torque transfer mechanism for said second input shaft so as to establish a Neutral non-driven mode.

12. The power transfer apparatus of claim 11 further comprising lock-out means for locking said interaxle differential so as to rigidly couple said first and second output shafts for common rotation and thereby establish a Part-Time four-wheel drive mode, said lock-out means cooperating with said shift mechanism for establishing at least one of a Part-Time four-wheel low-range drive mode and a Part-Time four-wheel high-range drive mode.

13. The power transfer apparatus of claim 1 further comprising:
  a speed reduction apparatus for establishing a high-range speed ratio connection and a reduced low-range speed ratio connection between said second input shaft and said torque transfer mechanism;
  a range clutch that is movable between a high-range position for establishing a Full-Time four-wheel high-range drive connection and a low-range position for establishing a Full-Time four-wheel low-range drive connection; and
  a shift mechanism that is operable for moving said range clutch between said high-range and low-range positions.

14. The power transfer apparatus of claim 13 wherein said range clutch is movable to a neutral position for disconnecting said torque transfer mechanism from driven connection with said second input shaft so as to establish a Neutral non-driven mode.

15. The power transfer apparatus of claim 1 wherein said first and second output shafts are commonly aligned for relative rotation about said third rotary axis.

16. A power transfer apparatus for transferring drive torque from a vehicular drivetrain to first and second drivelines, comprising:
  a first input shaft rotatably driven by the drivetrain about a first rotary axis;
  a second input shaft supported for rotation by the second rotary axis that is angled relative to said first rotary axis;
  a constant velocity universal joint interconnecting said second input shaft for rotation with said first input shaft;
  first and second output shafts respectively interconnected to the first and second drivelines, at least one of said first and second output shafts being supported for rotation about a third rotary axis is offset from said second rotary axis;
  an interaxle differential interconnecting said first and second output shafts, said interaxle differential including an input, a first output selectively coupled for rotation with said first output shaft, a second output coupled for rotation with said second output shaft, and gear means for transferring drive torque from said input to said first and second outputs;
  a torque transfer mechanism interconnecting said input of said interaxle differential to said second input shaft; and
  a lock-out clutch that is operable in a first position whereat said first output of said interaxle differential is coupled to said first output shaft for establishing a Full-Time four-wheel drive mode permitting speed differentiation between said first and second output shafts, said lock-out clutch being operable in a second position whereat said input and said first output of said interaxle differential are coupled for common rotation with said first output shaft for establishing a Part-Time four-wheel mode inhibiting speed differentiation between said first and second output shafts, and wherein said lock-out clutch is operable in a third position whereat said first output of said interaxle differential is uncoupled from said first output shaft and said input of said interaxle differential is coupled to said first output shaft for establishing a Two-Wheel drive mode; and
  a shift mechanism for moving said lock-out clutch between said first, second and third positions.

17. The power transfer apparatus of claim 16 further comprising:
  a speed reduction apparatus for establishing a high-range speed ratio connection and a reduced low-range speed ratio connection between said second input shaft and said torque transfer mechanism; and
  a range clutch that is movable between a high-range position whereat said high-range connection is established and a low-range position whereat said low-range connection is established, said shift mechanism operable for controlling movement of said range clutch in addition to said lock-out clutch for establishing a Full-Time four-wheel high-range drive mode, a Part-Time four-wheel low-range drive mode, and a Two-Wheel high-range drive mode.

18. The power transfer apparatus of claim 17 wherein said shift mechanism is further operable for establishing a Part-Time four-wheel high-range drive mode.

19. The power transfer apparatus of claim 18 wherein said range clutch is movable to a neutral position for disconnecting said torque transfer mechanism from said second input shaft so as to establish a Neutral non-driven mode.

20. The power transfer apparatus of claim 16 wherein said torque transfer mechanism includes a drive hub rotatably supported on said second output shaft, a driven sprocket fixed to said drive hub, a drive sprocket fixed to said second input shaft, and a drive chain interconnecting said drive sprocket to said driven sprocket.

21. The power transfer apparatus of claim 16 wherein said interaxle differential is a dual planetary assembly such that said input is a planetary carrier, said first output is a first sun gear, said second output is a second sun gear, and said gear means includes a set of first planet gears rotatably supported on said planet carrier that are meshed with said first sun gear, a set of second planet gears rotatably supported on said planet carrier and which are meshed with said second sun gear, each of said first planet gears being meshed with one of said second planet gears.

22. A power transfer apparatus for transferring drive torque from a vehicular drivetrain to first and second drivelines, comprising:

a first input shaft adapted to be rotatably driven by the drivetrain about a first rotary axis;

a second input shaft supported for rotation about a second rotary axis that is angled relative to said first rotary axis;

a constant velocity universal joint interconnecting said second input shaft for rotation with said first input shaft;

first and second output shafts adapted to be respectively interconnected to the first and second drivelines, at least one of said first and second output shafts being supported for rotation about a third rotary axis that is offset from said second rotary axis;

an interaxle differential interconnecting said first and second output shafts, said interaxle differential including an input, a first output adapted to be selectively coupled for rotation with said first output shaft, a second output fixed for rotation with said second output shaft, and gear means for transferring drive torque from said input to said first and second outputs;

a lock-out clutch that is operable in a first position for directly coupling said first output of said interaxle differential to said first output shaft for establishing a Full-Time four-wheel drive mode, and in a second position for coupling said input and first output of said interaxle differential for common rotation with said first output shaft so as to establish a Part-Time four-wheel drive mode;

a speed reduction apparatus for establishing a high-range speed ratio connection and a reduced low-range speed ratio connection between said second input shaft and said input of said interaxle differential;

a range clutch that is movable between a high-range position whereat said high-range connection is established and a low-range position whereat said low-range connection is established; and a shift mechanism controlling movement of said lock-out clutch and said range clutch for establishing a Full-Time four-wheel high-range drive mode, whereat said lock-out clutch is in said first position and said range clutch is in said high-range position, and a Part-Time four-wheel low-range drive mode whereat said lock-out clutch is in said second position and said range clutch is in said low-range position.

23. The power transfer apparatus of claim 22 wherein said lock-out clutch is further operable for movement to a third position for uncoupling said first output of said interaxle differential from said first output shaft and directly coupling said input of said interaxle differential to said first output shaft for establishing a Two-Wheel drive mode, and wherein said shift mechanism is operable for controlling movement of said lock-out clutch and said range clutch for establishing a Two-Wheel high-range drive mode with said lock-out clutch in said third position and said range clutch in said high-range position.

24. The power transfer apparatus of claim 23 wherein said shift mechanism is further operable for establishing a Part-Time four-wheel high-range drive mode whereat said lock-out clutch is in said second position and said range clutch is in said high-range position.

25. The power transfer apparatus of claim 24 wherein said range clutch is movable to a neutral position for disconnecting said input of said interaxle differential from driven connection with said second input shaft for establishing a Neutral non-driven mode.

* * * * *

UNITED STATES PATENT AND TRADEMARK OFFICE
CERTIFICATE OF CORRECTION

PATENT NO. : 5,609,540            PAGE 1 OF 2
DATED : MARCH 11, 1997
INVENTOR(S) : JAMES S. BRISSENDEN, JOHN D. ZALEWSKI

It is certified that error appears in the above-identified patent and that said Letters Patent is hereby corrected as shown below:

ON THE TITLE PAGE, Under U.S. Patent Document, insert the following: "2,314,833 3/1943 Keese", "2,850,920 9/1958 Buckendale", "2,875,644 3/1959 Mancini", "3,827,520 8/1974 Mueller", "3,929,200 12/1975 Behar", "5,269,399 12/1993 Ito et al.".

Column 1, line 28, "twowheel" should be --two-wheel--.

Column 2, line 23, "cardion" should be --cardan--.

Column 2, line 26, "cardion" should be --cardan--.

Column 2, line 62, delete "out" (second occurrence in Patent).

Column 3, line 35, "section" should be --sectional--.

Column 4, line 2, "cardion" should be --cardan--.

Column 4, line 4, "cardion" should be --cardan--.

Column 4, line 29, "cardion" should be --cardan--.

Column 4, line 32, "cardion" should be --cardan--.

Column 4, line 35, "cardion" should be --cardan--.

UNITED STATES PATENT AND TRADEMARK OFFICE
CERTIFICATE OF CORRECTION

PATENT NO. : 5,609,540
DATED : MARCH 11, 1997
INVENTOR(S) : JAMES S. BRISSENDEN, JOHN D. ZALEWSKI

It is certified that error appears in the above-identified patent and that said Letters Patent is hereby corrected as shown below:

Column 4, line 37, "cardion" should be --cardan--.

Column 8, line 57, "splines" should be --spline--.

Column 13, line 50, claim 11, "for" should be --from--.

Column 15, line 34, claim 24, delete "adapted to be".

Column 15, line 43, claim 22, delete "adapted to be".

Column 15, line 50, claim 22, delete "adapted to be".

Signed and Sealed this

Tenth Day of February, 1998

BRUCE LEHMAN

*Attest:*

*Attesting Officer*       Commissioner of Patents and Trademarks